March 6, 1962 N. D. WEILLS 3,023,837
LIQUID DISPERSION AND VAPORIZATION UNIT
Filed Sept. 4, 1959 3 Sheets-Sheet 1
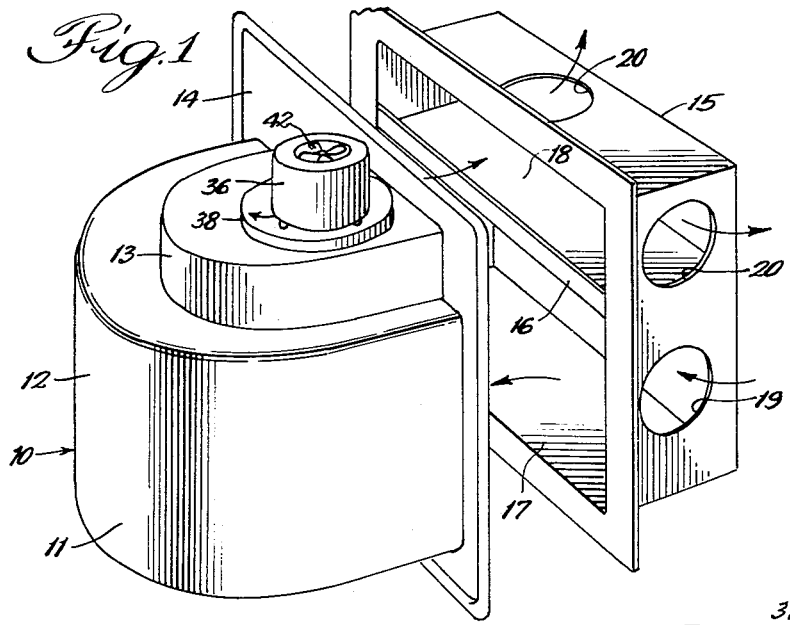
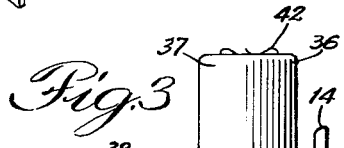
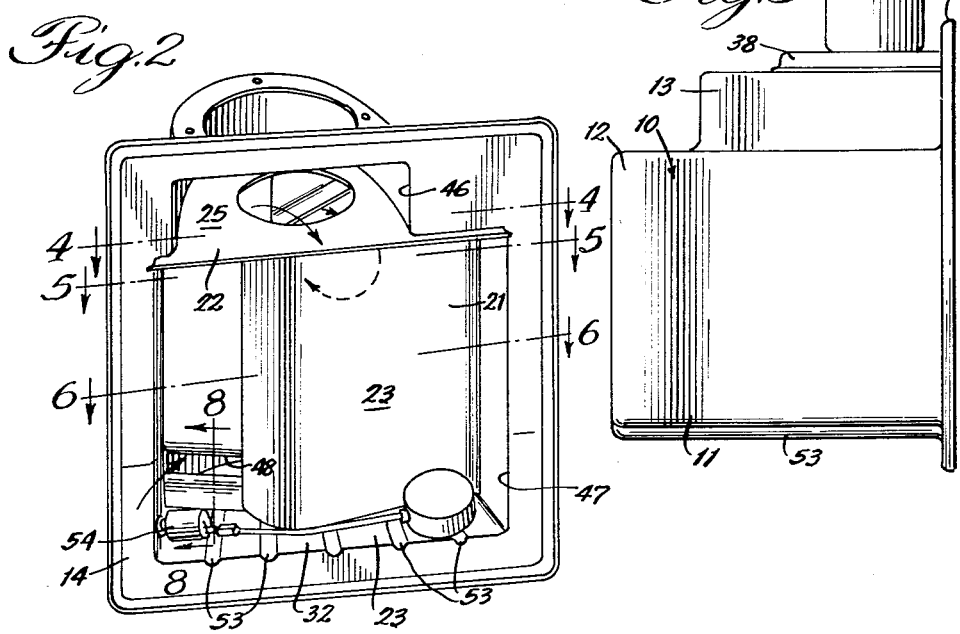
INVENTOR:
Ned D. Weills,
BY Dawson, Tilton, Fallon & Lungmus,
ATTORNEYS.

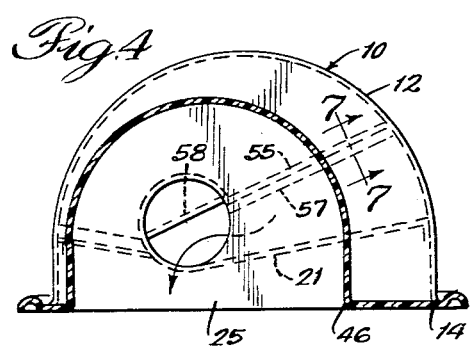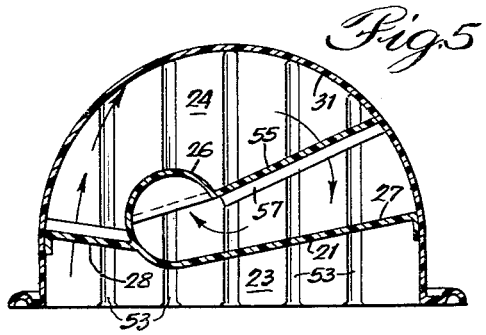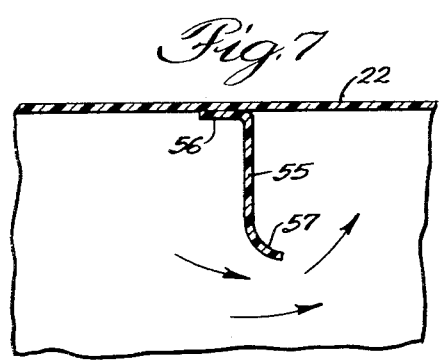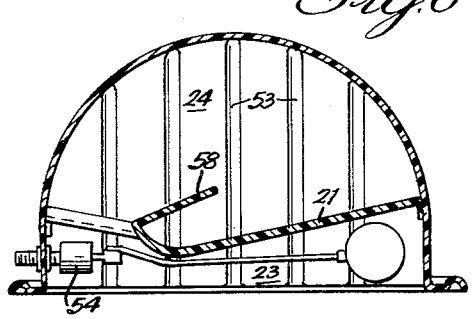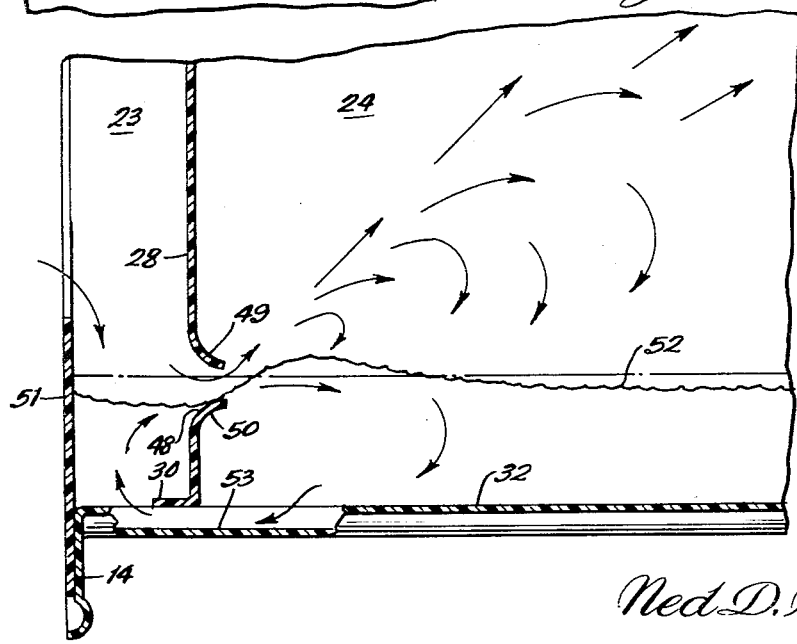

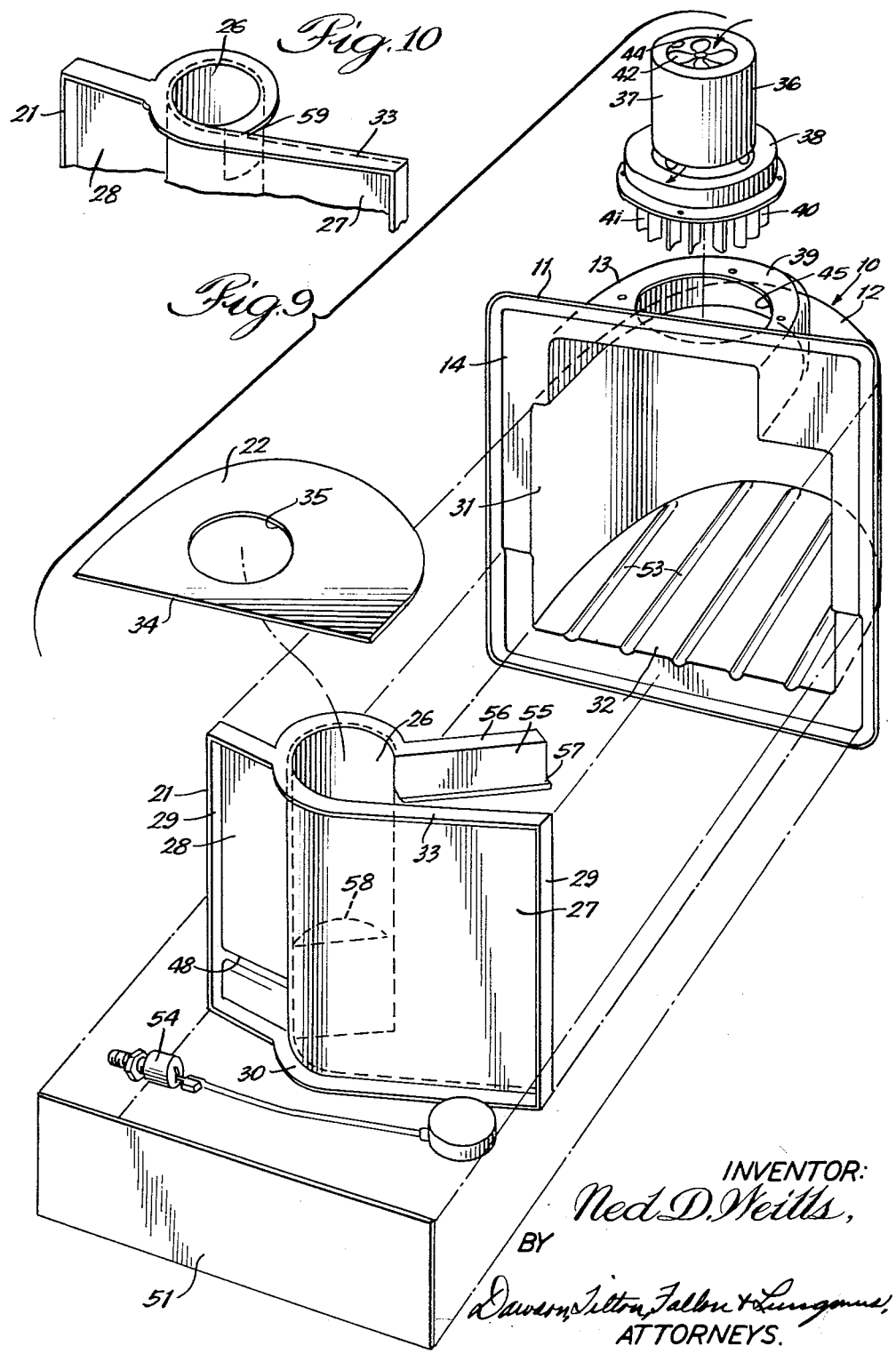

United States Patent Office 3,023,837
Patented Mar. 6, 1962

3,023,837
LIQUID DISPERSION AND VAPORIZATION UNIT
Ned D. Weills, Wichita, Kans., assignor to Repcor Inc., Wichita, Kans., a corporation of Kansas
Filed Sept. 4, 1959, Ser. No. 838,164
15 Claims. (Cl. 183—24)

This invention relates to a liquid dispersion and vaporization unit, and more specifically, to a device which is particularly suited for use as an air humidifier and which is equipped with means for driving a stream of relatively dry air or gas over a liquid surface to produce a spray or mist for at least partially saturating the moving gas with the liquid.

Structures which operate on a spray-forming principle for the dispersion of a liquid into a gas have been well-known in the art. However, as air humidifiers form home and commercial use, such structures have not been entirely satisfactory for a number of reasons. One failing arises from their tendency to discharge fine water droplets along with moisten air with the result that the droplets collect on surfaces which may corrode or which may become spotted or otherwise damaged thereby. Attempts to provide more complete droplet removal from the moving air have usually resulted in an increase in the mechanical complexity and size of the units, as well as a substantial decrease in their efficiency as humidifiers. Also, the frequent breakdowns and the maintenance problems of prior units are well-known and, in many cases, such problems tend to offset the advantages gained through the use of such systems.

Accordingly, it is main object of the present invention to provide a high-efficiency humidification unit which overcomes the aforementioned defects and disadvantages of prior units. Another object is to provide a humidifier having a unique baffle arrangement for the elimination of liquid droplets from the stream of saturated gas without, at the same time, appreciably affecting the efficiency of the humidifier. A further object is to provide a liquid-dispersing unit having an orifice of developed shape to provide effective liquid-gas interfacial contact and thereby provide a unit of high efficiency. A still further object is to provide a compact humidifier of relatively simple construction which, in operation, is virtually free from problems of corrosion and performance degradation arising from the accumulation of hard water deposits.

Other objects will appear from the specification and drawings in which:

FIGURE 1 is a perspective view illustrating a humidifier embodying the present invention and indicating a typical installation of that unit;

FIGURE 2 is a perspective view showing the rear of the humidifier unit, the motor assembly for the unit being removed for purposes of illustration;

FIGURE 3 is a side elevational view of the humidifier unit shown in FIGURE 1;

FIGURE 4 is a horizontal sectional view of the unit taken along line 4—4 of FIGURE 2;

FIGURE 5 is a horizontal sectional view taken along line 5—5 of FIGURE 2;

FIGURE 6 is a horizontal sectional view taken along line 6—6 of FIGURE 2;

FIGURE 7 is an enlarged broken sectional view taken along line 7—7 of FIGURE 4 and showing a baffle within the humidifier casing;

FIGURE 8 is an enlarged and broken vertical sectional view taken along line 8—8 of FIGURE 2 and showing the orifice construction of the humidifier;

FIGURE 9 is an exploded perspective view showing the several components of the present humidifier;

FIGURE 10 is a broken perspective view of part of the humidifier structure of FIGURE 9 showing a modification of that structure.

Referring to the drawings, the numeral 10 generally designates a humidifier having a casing or shell 11. While the shell may be formed from various materials, such as strainless steel and other metals, I prefer to form it from a plastic material such as high density polyethylene or polypropylene. As indicated most clearly in FIGURES 1 and 9, the entire shell may be formed in one piece and has a semi-cylindrical lower portion 12 and a semi-cylindrical upper portion 13 of smaller diameter, both portions being oriented along a vertical axis and being open at their sides. About the rear opening is an integral and outwardly extending mounting flange 14 which extends along a vertical plane and which is adapted to be clamped or otherwise secured to a distributor box such as box 15 illustrated in FIGURE 1.

The distributor box 15 has a cavity divided by partition 16 into a lower chamber 17 through which dry (and usually heated) air is passed and an upper chamber 18 through which humidified air passes. The box is provided with one or more openings 19 for placing the lower chamber in communication with suitable ducts leading to a source of relatively dry air, and with one or more upper openings 20 for the discharge of humidified air from chamber 18. Openings 20 may of course communicate with ducts leading to areas requiring a supply of the humid air. While I have shown the humidifier unit in conjunction with a distributor box which may, if desired, be disposed a substantial distance from a source of dry heated air, it is to be understood that the unit may communicate directly with the plenum chamber of a furnace or with any other source of heated or unheated gas, depending upon installation requirements and upon the particular use of the humidifier.

Within the cavity of casing 11 are a pair of partition elements 21 and 22 (FIGURE 9) which divide the interior of the casing into a rearwardly disposed intake chamber 23 (FIGURES 2 and 5), a spiral- or helical-shaped liquid dispersion and droplet elimination chamber 24 (FIGURES 5 and 6), and an upper discharge chamber 25 (FIGURES 2 and 4). The lower partition member 21 is vertically disposed and is somewhat scroll-shaped, having a generally semi-cylindrical central portion 26 continuous with wall portion 27. A second wall portion 28 merges with the curved outer surface of central portion 26 and, together with wall portion 27 and the rear of the semi-cylindrical portion 26, partitions the interior of the casing to form the front and rear chambers 24 and 23 respectively. As shown most clearly in FIGURE 9, the lateral and bottom edges of portions 26—28 are provided with rearwardly extending flanges 29 and 30 which may be fused or otherwise sealingly secured to the side and bottom walls 31 and 32 respectively of the shell or casing 11.

The top edges of portions 26—28 are similarly provided with merging flanges 33 and these flanges are sealingly secured to the undersurface of horizontal partition element 22. The rear edge 34 of the horizontal partition is straight and is in substantial alignment with the mounting flange 14 of the casing, while the remaining peripheral edge portions of the partition engage the inner surface of curved casing wall 31. Thus, partition 22 separates the outlet chamber 25 from the two chambers 23 and 24 disposed therebelow. A generally central opening 35 in the partition places the upper outlet chamber 25 in communication with the central portion of the dispersion and droplet elimination chamber defined by semi-cylindrical portion 26 of the vertical partition.

The air circulating means for the humidifier comprises a blower 36 including a motor-enclosing casing or shroud 37 secured at its lower end to a mounting plate 38 which in turn is bolted or otherwise attached to the top wall 39 of the shell or casing 11. The rotatable shaft of the motor is vertically oriented and, as indicated in FIGURE 9, is equipped at its lower end with a centrifugal action impeller 40 having a plurality of depending blades 41 arranged in an annular series about the vertical axis of rotation. When the blower is viewed from above as in FIGURE 9, the direction of rotation is clockwise and, in the illustration given, it will be observed that the depending blades are curved outwardly and rearwardly with reference to the direction of impeller rotation. It has been found that an impeller with rearwardly curved blades is considerably more efficient and performs more effectively than an impeller with forwardly curved blades because of the static pressure and air-flow relationship characteristics of the humidifier unit. Also, it has been found that the rearward curvature of the blades tends to protect the blower against overloading over a wide range of working conditions.

The upper end of the motor shaft is provided with a propeller 42 having blades pitched to direct air downwardly when the shaft is rotated. Referring to FIGURE 9, it will be seen that the cylindrical motor shroud 37 terminates at its lower end above the mounting plate 38. At its upper end, the shroud or motor shell is provided with an intake opening 44 so that when the blower is in operation propeller 42 draws cooling air through the top opening and directs it downwardly about the motor within the shroud, the air finally being discharged through the circumferential space between the shroud's lower edge and the upper surface of the mounting plate.

As shown in FIGURE 9, the top wall 39 of the casing 11 is provided with an enlarged opening 45 for insertion of the impeller 40 into the upper outlet chamber of the casing when the parts are being assembled. Thus, when the blower is secured to the humidifier casing, the impeller 40 is disposed within the outlet chamber 25 and, upon operation of the motor, draws humidified air upwardly through opening 35 in horizontal partition 22 and forces it outwardly through the rear opening 46 of the outlet chamber. Opening 46 thereby serves as an outlet for humidified air while the larger rear opening 47 beneath partition 22 serves as an intake or inlet for relatively dry air.

Referring to FIGURES 2, 8 and 9, it will be seen that the wall portion 28 of the vertical partition 21 is provided with a horizontally elongated orifice 48 spaced above the bottom wall 32. Wall portion 28 curves forwardly above and below orifice 48 to provide upper and lower lips 49 and 50 which project into the liquid dispersing chamber 24 (FIGURE 8). A vertical panel 51 sealingly secured to the mounting flange 14 at the lower rear portion of the humidifier casing serves to retain a body of liquid 52 (FIGURE 8) within the lower portions of chambers 23 and 24. It will be noted that these chambers are in communication not only through orifice 48 but also through a plurality of grooves or recesses 53 formed as an integral part of the casing's bottom wall 32.

The liquid level within chambers 23 and 24 may be automatically controlled by a float valve assembly 54 which is preferably disposed in the lower portion of the intake chamber 23. Since such a float valve is entirely conventional in construction and operation, further description is believed unnecessary herein. If desired, a suitable heating unit (not shown) may be provided in the lower portion of the humidifier casing to heat the liquid contained therein.

In the embodiment of the invention illustrated in FIGURES 1 through 9, the semi-cylindrical central portion 26 of the partition 21 has a vertical edge which terminates in spaced relation with reference to the forward surface of wall portion 27 and which, at its upper end, merges with a radially extending baffle 55. In FIGURE 5 it will be seen that the baffle 55 extends along a generally vertical plane and bridges the space between the outer surface of central portion 26 and the inner surface of the casing's side wall 31. Baffle 55 is provided along its top with a forwardly projecting flange 56 which is secured to or which sealingly engages the undersurface of the horizontal partion 22. The lower portion of the baffle is curved to define a rearwardly and downwardly sloping lip 57, as shown most clearly in FIGURE 7.

Preferably, the cylindrical wall of the scroll-shaped partition 21 is provided with an indentation or recess 58 along its lower portion within the droplet forming chamber 24 so that the curved wall of the scroll will not interfere with the formation of a liquid spray within that chamber.

In the operation of the structure illustrated in the drawings, air or other gas is drawn forwardly through orifice 48 into the droplet-forming chamber by means of blower 36. The float valve 54 maintains a liquid level within chambers 23 and 24 slightly above the lower lip 50 of the orifice so that as the rapidly moving air emerges from the orifice, it picks up and entrains the liquid forming a well distributed spray pattern having extensive gas-liquid interfacial area. As shown in FIGURE 8, the liquid is depressed directly below the air stream through the orifice and rises within chamber 24 such that the vertical distance between its lowest and highest levels correlates with the pressure of the rapidly moving air.

It has been found that the width to height ratio of the horizontally elongated orifice cannot be increased much beyond 10 without producing an oscillatory or seesaw motion in the water level adjacent the orifice resulting in an unsteady surging operation and reducing the humidifying capacity of the unit. However, it has also been found that the humidifying efficiency decreases as the width to height ratio approaches unity since a smaller proportion of the air passing through the orifice will contact the water. Taking into consideration the sensitivity of the float valve, width to height ratios ranging between two to five have been found satisfactory with an optimum ratio being approximately three.

As already indicated, the mechanism of spray formation and partial saturation of the air may be regarded as a liquid-air interface contact produced by air-flow separation and recirculation upon expanding after passing through an efficiently developed orifice. In this connection, it will be noted that the rounded upper and lower lips 49 and 50 of the orifice provide a contoured inlet for the air. It has been found that for a given pressure drop across the orifice, the air flow through an orifice having curved lips positioned in a vertical plane may be as much as 40 percent greater than the flow through an orifice without the lips.

The portion of wall 28 below the horizontally elongated orifice serves to protect the blower motor should the water supply to the unit be cut off. Thus, the wall portion below the elevated orifice provides a fixed or minimum resistance to the flow of air therethrough, thereby limiting the air flow through the unit and the work performed by the motor.

The upward direction of air flow beyond orifice 48 arises from its expansion, the higher liquid level within chamber 24, and the fact that the blower which is disposed above the droplet dispersion chamber forces air upwardly and outwardly. As the rapidly moving air passes upwardly in a spiral path, the droplets carried thereby tend to move outwardly in a larger arc by reason of centrifugal force and the larger droplets are thrown against the curved forward wall 31 of the casing. Consequently, the inner surface of this wall serves as a first or primary baffle for the extraction of droplets from the air stream without at the same time significantly restraining the upward flow of air.

Small droplets of liquid may not impinge on the cylindrical wall 31 but will instead be carried by the air stream in a curved upward path towards the opening into the discharge chamber. These droplets are carried against the secondary baffle 55 which extends downwardly from the roof of chamber 24 (FIGURE 7). Thus, the primary and secondary baffles coact to extract substantially all of the droplets from the spray which would otherwise pass upwardly into the discharge chamber 25.

In the embodiment illustrated in FIGURES 1 through 9, I have shown a humidifier having a radially extending secondary baffle 55. This baffle may also be formed as an arcuate continuation of the curved inner wall portion 26, as indicated in FIGURE 10 by the numeral 59. Such a construction not only simplifies fabrication of the parts but, since all air passing into the discharge chamber must flow beneath baffle 59, results in a highly effective secondary baffle of limited horizontal dimensions. In either of the forms illustrated in the drawings, the provision of two baffles, one of which comprises the confining inner surface of the casing, results in a unit of high humidification efficiency while at the same time producing extremely effective droplet extraction.

In the foregoing description and drawings, I have disclosed a humidifier formed essentially of four separate parts (excluding motor 36), such parts consisting of shell 11, partitions 21 and 22, and panel 51. It is to be understood, however, that substantially the same housing may be constructed by forming certain of the parts integrally (such as the lower portion of shell 11 and panel 51, or partitions 21 and 22) and by forming other of the parts as separate sections (such as the upper and lower portions of shell 11) to meet the requirements of injection molding techniques or other high volume production techniques without producing a completed housing significantly different in either structure or operation from the assembled housing illustrated in the drawings. It will be further understood that while I have disclosed two embodiments of the present invention in considerable detail for purposes of illustration many of these details may be varied without departing from the spirit and scope of the invention.

I claim:

1. A humidifier comprising a casing having a vertical wall in the shape of a scroll and defining a humidification and droplet-extraction chamber of helical configuration therein, said casing providing an air intake orifice communicating with said chamber adjacent the outer end thereof and providing upper and lower lips for said orifice projecting into said chamber, said chamber being adapted to support a body of liquid therein having a level above said lower lip, means provided by said casing and centrally disposed above said chamber for drawing air in an upward spiral through said orifice and through said chamber, said scroll-shaped vertical wall directing moisture-laden air drawn through said chamber and collecting water droplets moving outwardly under centrifugal force from the upwardly spiralling stream of air.

2. The structure of claim 1 in which said orifice is rectangular in shape and is horizontally elongated having a width-height ratio no greater than approximately 10.

3. A humidifier comprising a casing having a vertical wall in the shape of a scroll and defining a humidification and droplet-extraction chamber therein of helical configuration, said casing having a vertical partition providing an air intake orifice communicating with said helical chamber at the outer end thereof, said chamber being adapted to support a body of water therein having a level above the lower edge of said orifice, means provided by said casing and centrally disposed above said chamber for drawing air in an upward spiral path from said orifice through said chamber, said vertical wall having a curved portion between said orifice and said means constituting a first baffle for collecting water droplets moving outwardly from said spiral path under the influence of centrifugal force, and a second baffle disposed between said first baffle and said air-drawing means.

4. The structure of claim 3 in which said casing is provided with a horizontal partition above said chamber, said partition being provided with an outlet for the flow of humidified air from said chamber, said second baffle comprising a vertical member depending from said partition and being disposed adjacent said outlet for extracting water droplets from air impinging on said second baffle and passing therebelow towards said outlet.

5. The structure of claim 3 in which the vertical partition providing said orifice also provides upper and lower lips extending along the upper and lower edges of said orifice and projecting into said chamber.

6. The structure of claim 3 in which said orifice is rectangular in shape having a width-height ratio no greater than 10.

7. A humidifier comprising a casing having an air intake chamber and an intermediate chamber for the humidification of air and for the removal of water droplets therefrom, a vertical partition being interposed between said intake and intermediate chambers and having an orifice spaced above the bottom thereof, said chambers being adapted to support a body of water having a level above the lower edge of said orifice, a horizontal partition extending over said intermediate chamber and having a centrally disposed air outlet communicating with said intermediate chamber, means for drawing air in an upward spiral path through said intermediate chamber between said orifice and said outlet, a first baffle comprising a horizontally curved vertical wall of said casing defining said intermediate chamber for collecting water droplets moving outwardly from said spiral path under the influence of centrifugal force, and a second baffle disposed between said first baffle and said air outlet.

8. The structure of claim 7 in which said means for drawing air comprises a centrifugal blower disposed above said horizontal partition for drawing air upwardly through said outlet.

9. The structure of claim 7 in which said second baffle comprises a vertical member spaced above the bottom of said intermediate chamber adjacent said air outlet.

10. The structure of claim 9 in which said vertical member extends radially from said air outlet.

11. The structure of claim 9 in which said vertical member is arcuate and extends about a portion of said air outlet.

12. In a humidifier, the combination comprising a vertically extending wall in the shape of a scroll having spaced convolutions defining a vertically elongated chamber of helical shape, said scroll-shaped wall having an inner end portion defining a centrally disposed vertical passage merging with said chamber, a horizontal partition extending over the top of said wall and having an outlet opening communicating with the upper end of said vertical central passage, a vertical partition at the outer end of said helical chamber providing a restricted intake orifice adjacent the bottom thereof, and means disposed above said outlet opening for drawing air through said chamber and passage in an inwardly spiralling stream from said intake orifice to said outlet opening, whereby, as moisture-laden air is drawn in an upwardly spiralling path through said helical chamber, water droplets carried by the air are thrown outwardly against said wall under the influence of centrifugal force.

13. The structure of claim 12 in which a depending baffle plate is provided adjacent said outlet opening and between said chamber and said passage.

14. A humidifier comprising a casing having a vertical wall in the shape of a scroll and defining a humidification and droplet-extraction chamber of helical configuration therein, said casing providing an air intake orifice communicating with said chamber adjacent the outer end thereof, said chamber being adapted to support a body of liquid therein having a level intermediate the upper and lower limits of said orifice, means provided by said casing and centrally disposed above said chamber for drawing air in an upward spiral through said orifice and through said chamber, said scroll-shaped vertical wall directing moisture-laden air drawn through said chamber and collecting water droplets moving outwardly under centrifugal force from the upwardly spiralling stream of air.

15. A humidifier comprising a casing having a vertical wall in the shape of a scroll and defining a humidification and droplet-extraction chamber of helical configuration therein, said casing providing an air intake orifice communicating with said chamber adjacent the outer end thereof, said chamber being adapted to support a body of liquid therein having a level intermediate the upper and lower limits of said orifice, means provided by said casing and centrally disposed above said chamber for drawing air in an upward spiral through said orifice and through said chamber, said scroll-shaped vertical wall comprising a first baffle for directing moisture-laden air through said chamber and for collecting water droplets moving outwardly under centrifugal force from the upwardly spiralling stream of air, and a second baffle disposed between said first baffle and said air-drawing means, said second baffle comprising a vertical member spaced above the bottom of said chamber.

References Cited in the file of this patent

UNITED STATES PATENTS

| | | |
|---|---|---|
| 1,138,460 | Derby | May 4, 1915 |
| 2,171,574 | Lambert et al. | Sept. 5, 1939 |
| 2,459,635 | Fenn | Jan. 18, 1949 |
| 2,551,890 | Love | May 8, 1951 |
| 2,625,383 | Baird | Jan. 13, 1953 |
| 2,812,167 | Wroth | Nov. 5, 1957 |